United States Patent [19]

Hawkins

[11] Patent Number: 5,100,098
[45] Date of Patent: Mar. 31, 1992

[54] STAND AND HANDLE FOR HAND HELD COMPUTER

[75] Inventor: Jeff C. Hawkins, Redwood City, Calif.

[73] Assignee: Grid Systems Corporation, Fremont, Calif.

[21] Appl. No.: 364,926

[22] Filed: Jun. 12, 1989

[51] Int. Cl.$^5$ ............................................. F16M 13/00
[52] U.S. Cl. .................................... 248/917; 248/291; 364/708; 361/392
[58] Field of Search ............... 248/291, 917, 919, 920, 248/923; 361/392; 364/708

[56] References Cited

U.S. PATENT DOCUMENTS 4,669,694  6/1987  Malick ................................. 248/923
4,830,328  5/1989  Takach, Jr. et al. ................ 248/923

Primary Examiner—Allen R. Macdonald
Assistant Examiner—Debra A. Chun
Attorney, Agent, or Firm—Townsend & Townsend

[57] ABSTRACT

A portable computer, which may be a hand held computer useful for field work, has an attachment which can serve as both a carrying handle for the computer and a stand for holding the computer in a convenient position for use on a desk, at an appropriate angle for viewing the screen. The stand and handle has two plate-like arms connected by a hinge which serves as the handle and with one of the arms securable by a snap-in arrangement to the back or underside of the computer. The computer may have an expansion module secured to its backside, in which case the arm of the stand/handle is secured to the back of the expansion module. In one embodiment the stand and handle device is permanently second to the computer, rather than detachable.

9 Claims, 3 Drawing Sheets

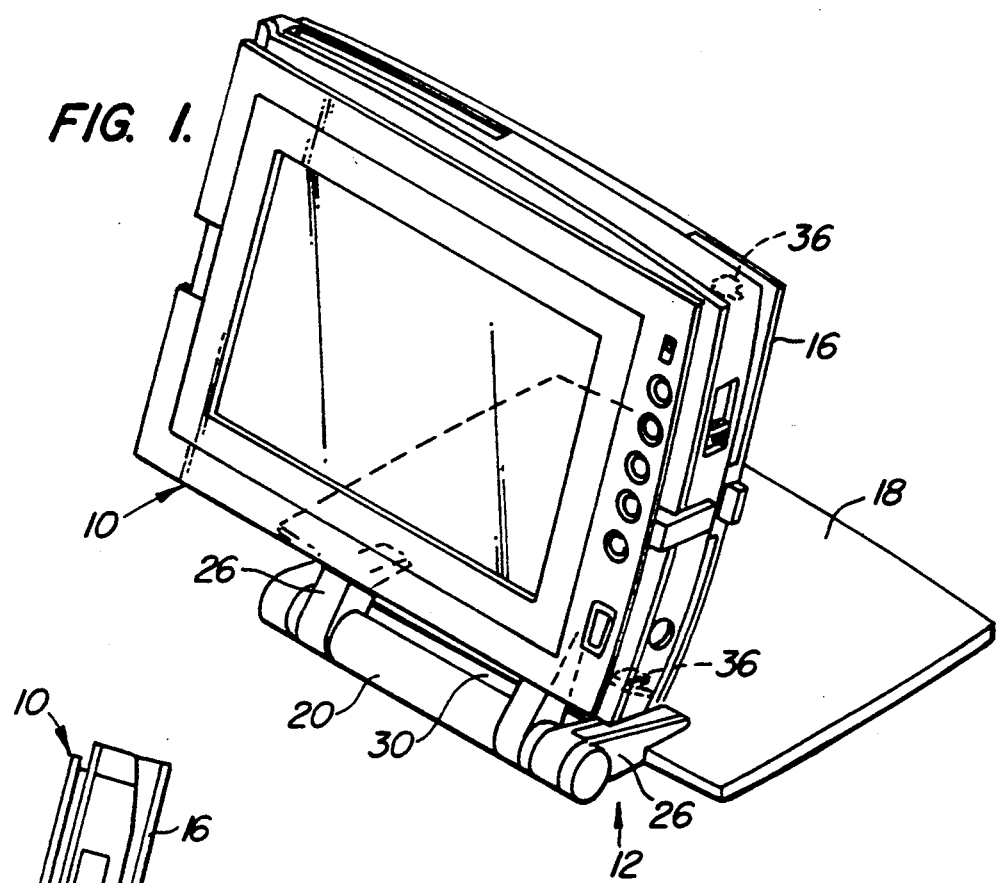
FIG. 1.
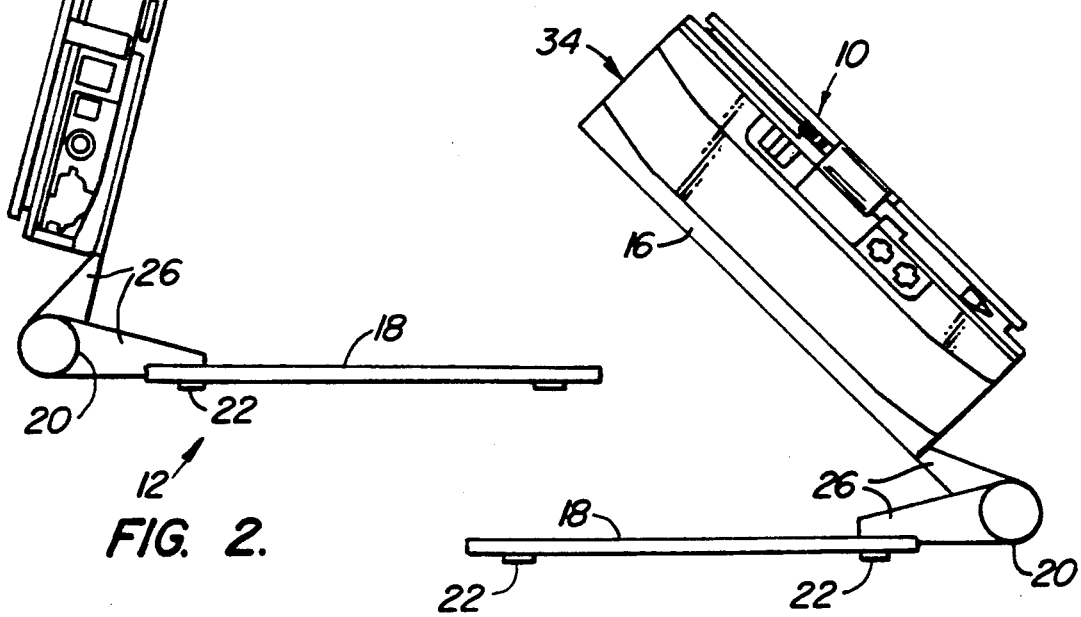
FIG. 2.
FIG. 3.

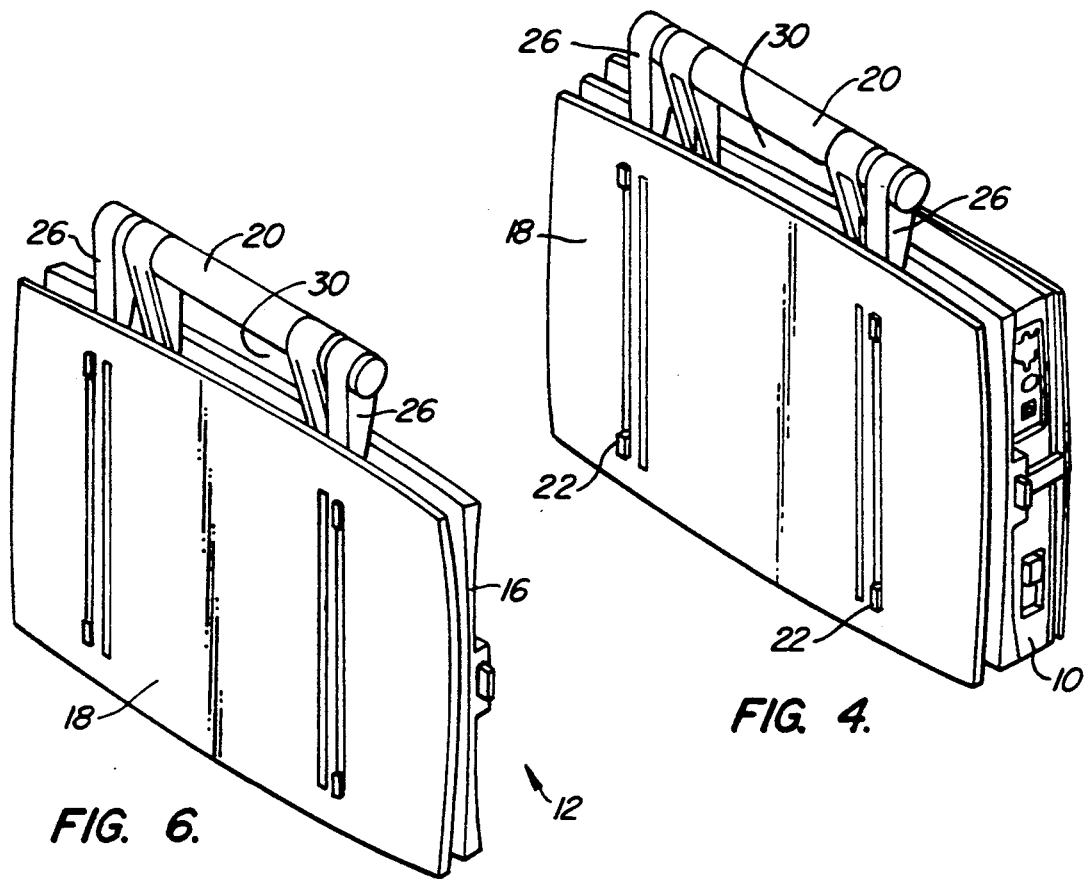
FIG. 4.
FIG. 6.
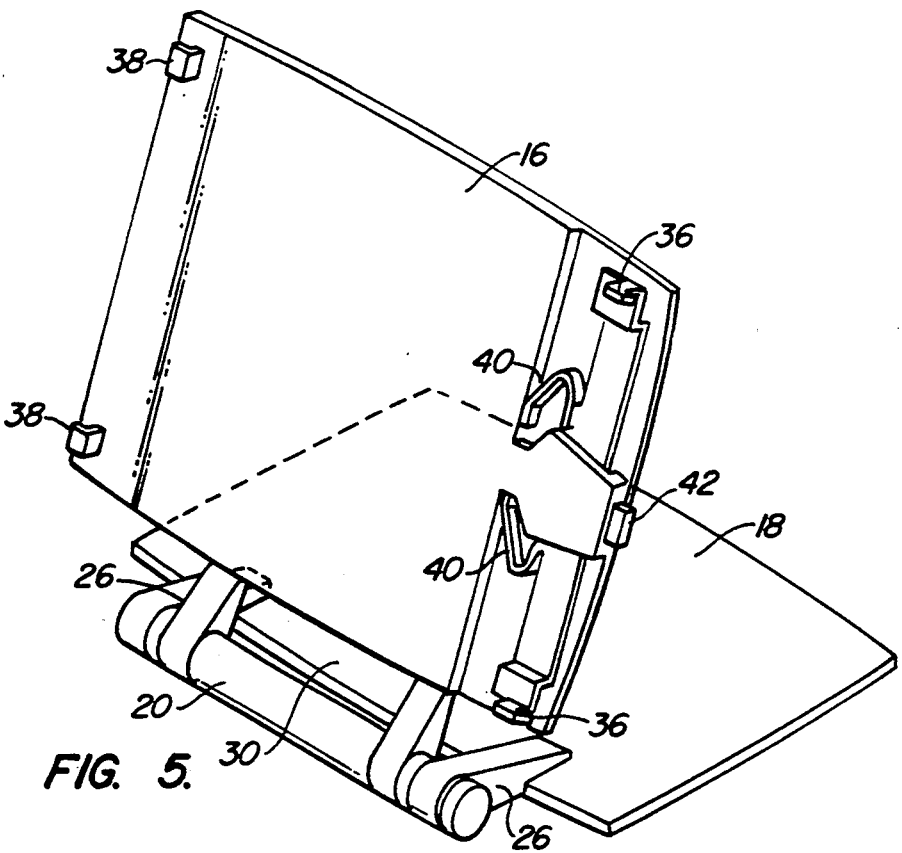
FIG. 5.

STAND AND HANDLE FOR HAND HELD COMPUTER

BACKGROUND OF THE INVENTION

The invention relates to portable computers, and in particular is concerned with a device for connection to a portable computer, particularly a hand held computer, for increasing the versatility of the computer.

Portable computers have been produced in a number of different forms. These have included portable computers of various sizes, weights, thicknesses and functional uses. One particular class of computers known as hand held computers includes small computer devices which can easily be held in one hand and which have generally included a small one-finger type keyboard and a screen several inches wide. Approximately the size and the bulk of a walkie-talkie radio, the conventional hand held computers were often used by salesmen, route delivery people, inventory personnel and other field workers needing to gather and input information in the field for storage and later retrieval.

A new type of hand held computer is disclosed in copending application Ser. No. 07/365,147 entitled "Hand Held Computer", filed concurrently with this application, assigned to the same assignee as the present invention and hereby incorporated herein by reference. Such a computer is low in profile, light in weight and easily carried and held against one arm in the manner of a tablet or clipboard, with the other hand used for writing on the screen with a conductive stylus.

The new computer discussed above can also be connected to an expansion module for further functions or increased power, as disclosed in co-pending application Ser. No. 07/364,919, entitled "Connection Between Portable Computer Components", also filed concurrently with this application, assigned to the same assignee as the present invention and incorporated herein by reference. With the two components thus connected, the resulting computer unit is still portable but of somewhat greater bulk.

With such hand held computers, and some other computers or components of relatively low profile, there is generally a need for a convenient and safe carrying arrangement for taking the computer into the field; there is also a need with a tablet-type computer for a suitable means to set the computer up on a desk for comfortably viewing the screen and for use with a detachable keyboard. These are objects of the present invention described below.

SUMMARY OF THE INVENTION

In accordance with the present invention a stand and handle apparatus has a provision for connection to the back of a hand held computer as referenced above. The stand and handle device has a first arm which is preferably plate-like in shape and which preferably secures to the back of the computer by a convenient snap-on connection.

Another arm of the stand/handle unit, also preferably flat and plate-like in shape, serves as a base for resting against a desk top or other horizontal surface.

The two parts or arms of the stand and handle unit are connected together by a hinge having a cylindrical central section which is spaced away from remaining structure of the device and serves as a comfortable hand grip or handle for carrying the computer. The hinge also permits rotation of the two plate-like arms from a carrying handle position wherein they are closely engaged together in folded, closed position to an open position wherein the two arms are at an acute angle. At this angle the base arm can be placed against a desk top so that the computer is held at an oblique, back-leaning angle for comfortable viewing of the screen. With a keyboard connected to this computer, it can function generally as a desk top computer.

Latches may be provided for holding the base arm in the closed position for the carrying handle function, and for holding it in the stand position, angled from the other arm. The stand latch may have provision for locking the hinge in several different positions to enable the adjustment of the angle of viewing.

Angle adjustment may also be provided by maintaining constant friction in the hinge. This permits random angle settings within the hinging range, without requiring a latch for releasing or setting a position.

It is therefore among the objects of the present invention to add to the versatility of a portable computer with a stand and handle device which is easily secured to the back of the computer and which serves the functions of a field carrying handle and a desk top stand for the computer. Methods and apparatus which incorporate the features described above and which are effective to function as described above constitute further, specific objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a perspective view showing a hand held computer as secured to a stand and handle device of the invention, which is shown in a position serving as a desk top stand.

FIG. 2 is a side elevation view showing the computer and stand/handle device in a position similar to that of FIG. 1.

FIG. 3 is a side elevation view similar to that of FIG. 2 but showing both the computer and attached expansion module supported by the stand.

FIG. 4 is a perspective view showing the computer and attached stand/handle device in a different position, with the device functioning as a carrying handle.

FIG. 5 is a perspective view showing the stand and handle device alone, in the stand mode, and showing a latching mechanism.

FIG. 6 is a perspective view showing the stand and handle alone, in folded configuration.

DESCRIPTION OF PREFERRED EMBODIMENTS

Figure 7:
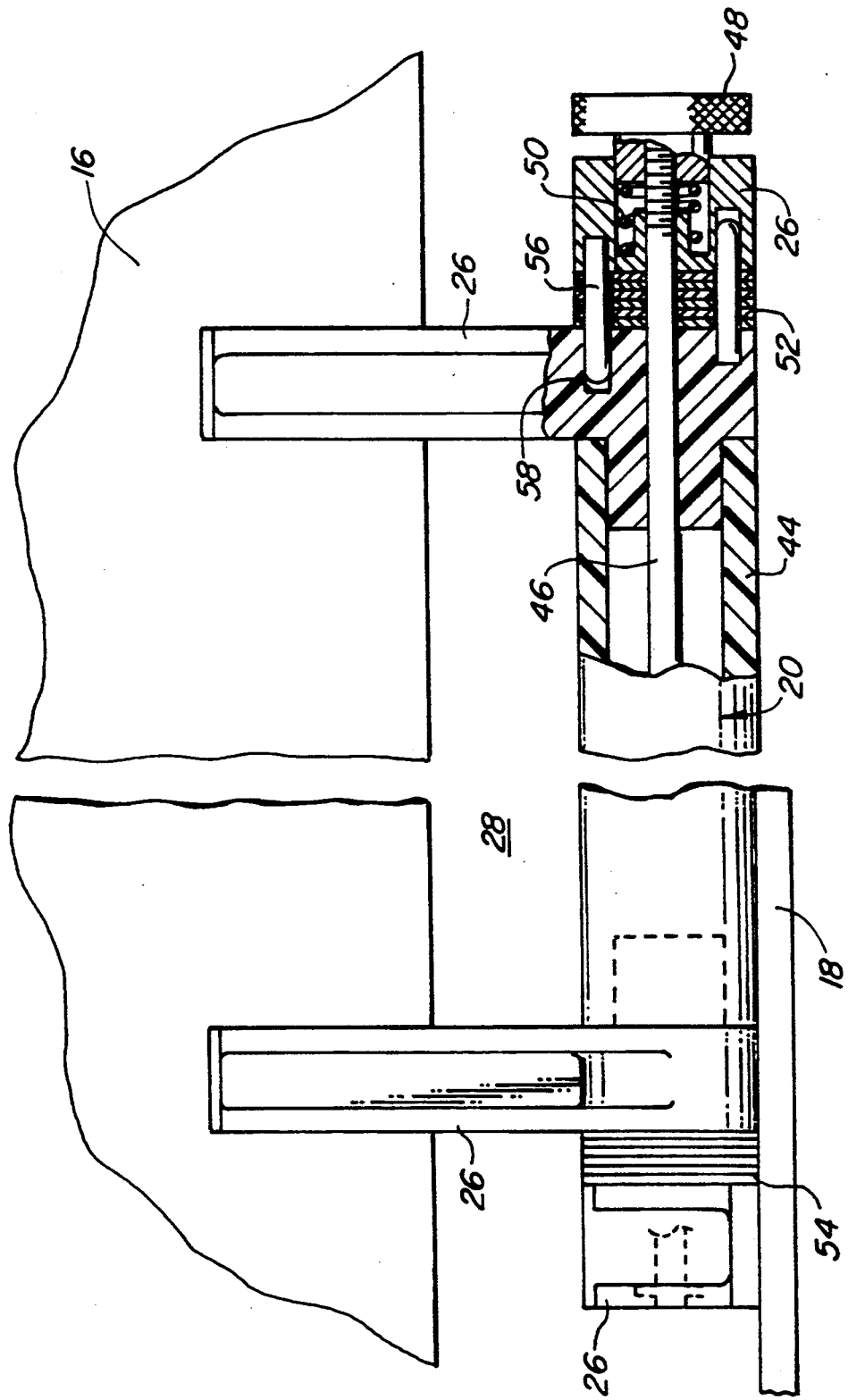
FIG. 7 is a view partially in section, showing one preferred form of hinge construction for the stand and handle device.

In the drawings, FIG. 1 shows a computer 10 attached to a stand and handle device 12 according to the principles of the present invention. The computer 10 may be a hand held computer as referenced above and the subject of a copending patent application. The computer 10 does not have a full keyboard, but preferably has the capability of writing on the screen with a conductive stylus or pen for entry of information into the computer. Because the computer is of this type, it ordinarily will not have a relatively large case with disk drives, keyboard, etc. on which a screen of the computer could be pivotally secured. Therefore, the computer 10, which may be connected by a cable to an external keyboard (not shown) for office use, often will need to be set up on a desk top as shown in FIG. 1, at an appropriate angle for viewing by an operator.

As shown in FIGS. 1 and 2, the stand and handle device 12 includes a pair of plate-like arms 16 and 18 which are pivotally secured together by a hinge 20. In this preferred embodiment each of the arms 16 and 18 comprises for the most part a generally flat plate. The arm 18 is a base arm, preferably flat-bottomed for engaging a horizontal surface such as a desk top. As shown in FIGS. 2 and 4, it may have resilient pads 22 for engaging against the desk surface.

The other arm 16, which is secured to the back side of the computer 10, is generally flat but may be shaped to conform to the shape of the back side of the computer, as shown in FIG. 2. A pair of structural members 26 connect the body of the plate-like arm 16 to the hinge 20, with an opening 30 left between the members 26 and adjacent to the hinge 20 to enable a user's fingers to wrap around the hinge in a carrying mode of the invention shown in FIG. 4.

As shown in FIG. 4, the base plate or arm 18 has a corresponding opening 30 which provides adequate space about the hinge 20 for comfortable gripping when the computer 10 is to be carried into the field.

FIG. 3 shows the stand and handle device 12 similar to FIG. 2, but with both the hand held computer 10 and an expansion unit 34 supported by the device, in the stand mode. In accordance with the invention, the connection plate or arm 16 of the stand/handle device has a snap-on connection system which will engage the back of the expansion unit 34 in the same way it engages the back side of the computer 10 itself. This connection system is further described below with reference to FIG. 5.

The expansion unit 34 connects to the back of the computer 10 preferably by an efficient snap-on system described in copending application Ser. No. 07/364,919, entitled "CONNECTION BETWEEN PORTABLE COMPUTER COMPONENTS" referenced above.

The hinge 20 preferably has a relatively large outer cylindrical surface as illustrated to provide a comfortable grip to the user.

FIG. 5 shows one preferred means for securing the first arm or computer back plate 16 to the back side of the computer, although other arrangements can be used. The plate 16 preferably includes a pair of spring-biased hook-shaped latches 36. These movable hooks 36 cooperate with stationary hooks 38 at an opposite end. The stationary hooks 38 are first hooked into slots in the back of the computer (or expansion module). As more fully described in copending application Ser. No. 07/364,919, incorporated herein by reference, the hooks 36 are cammed back to a retracted position against the force of springs 40 when the ramp-like hooks 36 engage corresponding slots in the back of the computer 10 (or in the back of the expansion module 34, FIG. 3). The springs 40 then snap the locking hooks into a locked position in engagement with the back of the computer or expansion module, whereby the four hooks 36 and 38 firmly hold the plate 16 to the computer component. A release button 42 enables manual retraction and release of the movable hooks 36 when the stand/handle device 12 is to be removed.

In a preferred embodiment the structure of the hinge 20 includes provision for holding the base plate or arm 18 in the closed position shown in FIGS. 4 and 6 and n multiple positions between the closed position and a limit-defined fully extended position, for different stand tilt angles as selected by the user. The limit to opening of the arm 18 may be, for example, about 85 degrees, assuring stability of the computer 10 on a desk top even at full extension.

One embodiment of such a position holding device comprises the provision of a frictional resistance in the hinge 20 and is illustrated in FIG. 7. The handle/hinge 20 has a central casing 44 which spaces the two structural members 26 apart, and a tension rod 46 inside the hinge, with a threaded manual knob 48 for increasing or decreasing pressure on a spring 50. This pressure is transferred to a series of stacked friction rings at 52 and also at 54, positioned between adjacent structural members 26 of the plates 16 and 18 as shown. One or more pins 56 are engaged in arcuate slots 58 to limit the permitted range of pivotal motion.

Thus, the user can adjust spring pressure and friction in the hinge as needed. Increased pressure will more securely lock the stand/handle in the desk top display position shown in FIGS. 1, 2, 3 and 5 as well as in the closed position of FIGS. 4 and 6 when desired.

The drawings illustrate the computer 10 as positioned in horizontal or "landscape" mode on the stand and handle device 12. Provision could also be made for accommodating the vertical or "portrait" mode (in which the computer 10 may be capable of operating, as described in application Ser. No. 07/364,919 referenced above) on the stand/handle 12, but the landscape mode is generally more important in desk top uses because it is the mode of MS-DOS and PC compatible computer software.

It should be understood that the present invention also encompasses the stand and handle device 12 in an embodiment permanently attached to the tablet type computer 10. FIGS. 1 and 4 can be seen as representing this alternate embodiment as well as the preferred embodiment in which the device 12 is a separable component.

While I have illustrated and described the preferred embodiments of our invention, it is to be understood that these are capable of variation and modification, and I therefore do not wish to be limited to the precise details set forth, but desire to avail myself of such changes and alterations as fall within the purview of the following claims.

I claim:

1. A stand and handle device for a portable computer, comprising,
    a first arm having releasable securing means for forming a stable connection to the back side of a computer,
    a second arm forming a base with surface engaging means for resting the second arm securely and stably on a horizontal surface, and
    hinge means pivotally connecting the first and second arms so as to permit the second arm or base to be rotated with respect to the first arm through a range of motion from a position of substantial engagement against the first arm to a limit position wherein the second arm forms an acute angle with the first arm, said hinge means including a hinge body with a space between the hinge body and the arms, whereby, with the first arm secured to the back of the computer the second arm may be put in the position of substantial engagement so that the hinge means extends from the computer and forms a carrying handle for the computer, or the second may be put at said acute angle position, enabling the computer to be placed on a desk with the second arm as a base.

2. The apparatus of claim 1, wherein the hinge body of the hinge means includes a grippable generally cylindrical element spaced away from adjacent structure of the stand and handle to enable the hinge means to serve as a carrying grip.

3. The apparatus of claim 1, including position holding means for holding the second arm in the acute angled stand position.

4. The apparatus of claim 1, including position holding means for retaining the second arm in any selected position of rotation with respect to the first arm, within said range of motion.

5. The apparatus of claim 4, wherein the position holding means comprises friction resistance means in the hinge means, for permitting forced pivoting of the hinge and for providing sufficient resistance to pivoting to hold the computer on a desk top in said acute angle position of the stand and handle device.

6. The apparatus of claim 5, wherein the friction resistance means includes adjustment mean for enabling manual adjustment of the resistance to pivoting.

7. The apparatus of claim 1, further including an expansion module for the computer, with module connection means on the module for securing a front of the module to the back side of the computer, and the module having a back side with means for engagement with the releasable securing means on the first arm of the stand and handle device, whereby the stand and handle device may be used to support either the computer alone or the computer and attached expansion module.

8. A stand and handle device for a portable computer, comprising, a first arm secured to the back side of a computer, a second arm forming a base with stably engaging means for resting the second arm securely and stably on a horizontal surface, and hinge means pivotally connecting the first and second arms so as to permit the second arm or base to be rotated with respect to the first arm through a range of motion from a position of substantial engagement against the first arm to a limit position wherein the second arm forms an acute angle with the first arm, said hinge means including a hinge body with a space between the hinge body and the arms, whereby, the second arm may be put in the position of substantial engagement so that the hinge means extends from the computer and forms a carrying handle for the computer, or the second may be put at said acute angle position, enabling the computer to be placed on a desk with the second arm as a base.

9. The apparatus of claim 8, including position holding means for holding the second arm in the acute angled stand position.

* * * * *